(12) United States Patent
Varga et al.

(10) Patent No.: US 11,697,268 B2
(45) Date of Patent: Jul. 11, 2023

(54) VEHICLE WINDOW, VEHICLE, AND METHOD FOR PRODUCING SAME

(71) Applicant: SAINT-GOBAIN GLASS FRANCE, Courbevoie (FR)

(72) Inventors: Gabor Varga, Düsseldorf (DE); Christian Effertz, Aachen (DE); Michael Zeiss, Herzogenrath (DE); Bastian Klauss, Aachen (DE); Guillaume Francois, Aachen (DE); Ali-Osman Kizmaz, Würselen (DE); Benjamin Kaplan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 430 days.

(21) Appl. No.: 16/650,254

(22) PCT Filed: Sep. 12, 2018

(86) PCT No.: PCT/EP2018/074553
§ 371 (c)(1),
(2) Date: Mar. 24, 2020

(87) PCT Pub. No.: WO2019/057574
PCT Pub. Date: Mar. 28, 2019

(65) Prior Publication Data
US 2020/0307166 A1 Oct. 1, 2020

(30) Foreign Application Priority Data
Sep. 25, 2017 (EP) ..................................... 17192877

(51) Int. Cl.
*B32B 17/10* (2006.01)
*B60J 1/02* (2006.01)
(Continued)

(52) U.S. Cl.
CPC .... *B32B 17/10036* (2013.01); *B32B 17/1077* (2013.01); *B32B 17/10174* (2013.01);
(Continued)

(58) Field of Classification Search
CPC ........ B32B 17/10036; B32B 17/10174; B32B 17/10761; B32B 17/1077;
(Continued)

(56) References Cited

U.S. PATENT DOCUMENTS

2005/0233125 A1 10/2005 Anderson et al.
2006/0275599 A1 12/2006 Lefevre
(Continued)

FOREIGN PATENT DOCUMENTS

CN 101087135 A 12/2007
DE 10 2004 050344 A1 4/2006
(Continued)

OTHER PUBLICATIONS

Machine Translation of WO 2013/091961 A1 (Year: 2013).*
(Continued)

*Primary Examiner* — Brian Handville
(74) *Attorney, Agent, or Firm* — Pillsbury Winthrop Shaw Pittman LLP

(57) ABSTRACT

A vehicle window, includes at least one transducer device and transducer electronics associated with the transducer device, wherein both the transducer device and the transducer electronics are arranged at least partially within the vehicle window, wherein the transducer device and/or a compensating device associated with the transducer device and arranged at least partially within the vehicle window and/or an electrical shielding device associated with the transducer device for electrically shielding the transducer device relative to a vehicle interior or a vehicle exterior are transparent, at least in sections.

20 Claims, 3 Drawing Sheets

Figure 1:
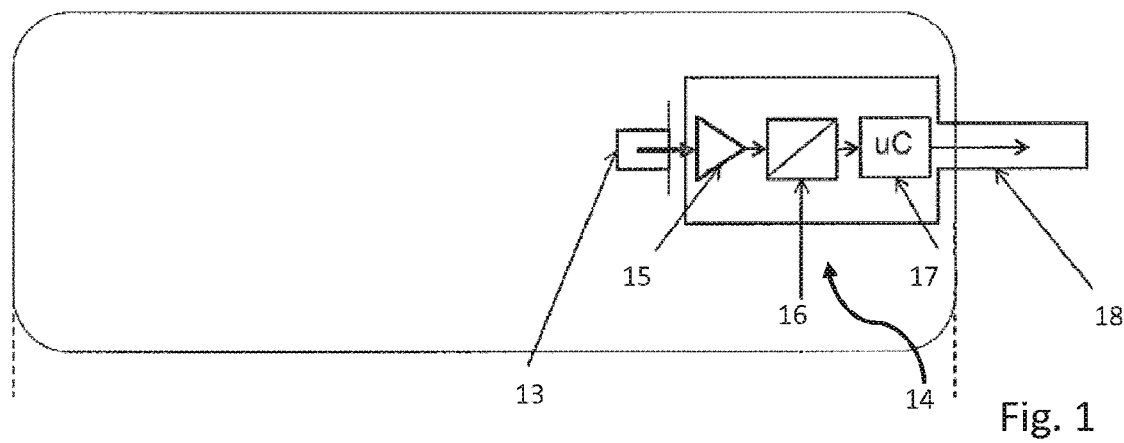

(51) Int. Cl.
*B60J 1/20* (2006.01)
*G01N 27/22* (2006.01)

(52) U.S. Cl.
CPC .. *B32B 17/10761* (2013.01); *B32B 17/10788* (2013.01); *B60J 1/02* (2013.01); *B60J 1/20* (2013.01); *G01N 27/223* (2013.01); *B32B 2307/202* (2013.01); *B32B 2307/206* (2013.01); *B32B 2307/212* (2013.01); *B32B 2605/006* (2013.01); *B32B 2605/08* (2013.01)

(58) Field of Classification Search
CPC ........ B32B 17/10788; B32B 2307/202; B32B 2307/206; B32B 2307/212; B32B 2605/006; B32B 2605/08; B60J 1/02; B60J 1/20; G01N 27/223
See application file for complete search history.

(56) References Cited

U.S. PATENT DOCUMENTS

| | | | |
|---|---|---|---|
| 2009/0039901 A1 | 2/2009 | Delatte et al. | |
| 2013/0019618 A1* | 1/2013 | Veerasamy | B60S 1/087 62/85 |
| 2015/0202846 A1* | 7/2015 | Byker | B32B 17/10036 204/192.27 |

FOREIGN PATENT DOCUMENTS

| | | |
|---|---|---|
| DE | 10 2009 053465 A1 | 5/2011 |
| EP | 2 121 308 B1 | 2/2016 |
| JP | H04-094563 U | 8/1992 |
| JP | H05-062365 U | 8/1993 |
| JP | H05-264496 A | 10/1993 |
| JP | 2009-505038 A | 2/2009 |
| WO | WO 2007/006781 A1 | 1/2007 |
| WO | WO 2013/091961 A1 | 6/2013 |
| WO | WO 2017/178146 A1 | 10/2017 |

OTHER PUBLICATIONS

Ardizzoni, John, A Practical Guide to High-Speed Printed-Circuit-Board Layout, 2005, ADI, vol. 39, No. 3, pp. 3-8, obtained from https://www.analog.com/media/en/analog-dialogue/volume-39/number-3/articles/volume39-number3.pdf (Year: 2005).*
International Search Report as issued international Patent Application No. PCT/EP2018/074553, dated Dec. 12, 2018.
Notice of Reasons for Rejection as issued in Japanese Patent Application No. 2020-517132, dated Apr. 6, 2021.
First Office Action as issued in Chinese Patent Application No. 201880002369.2, dated Apr. 19, 2022.
Decision of Final Rejection as issued in Japanese Patent Application No. 2020-517132, dated Dec. 21, 2021.
Report of Pretrial Examination as issued in Japanese Patent Application No. 2020-517132, dated Jun. 1, 2022.

* cited by examiner

VEHICLE WINDOW, VEHICLE, AND METHOD FOR PRODUCING SAME

CROSS-REFERENCE TO RELATED APPLICATIONS

This application is the U.S. National Stage of PCT/EP2018/074553, filed Sep. 12, 2018, which in turn claims priority to European patent application number 17 192 877.3 filed Sep. 25, 2017. The content of these applications are incorporated herein by reference in their entireties.

The invention relates to a vehicle window according to claim 1 and a vehicle according to claim 15.

Vehicle windows with sensors are known in the prior art, for example, from EP 2 121 308 B1. As described in EP 2 121 308 B1, these sensors can also be integrated into the vehicle window (between individual layers of the vehicle window).

CN 101 087 135 A presents a capacitive moisture sensor, wherein, in one embodiment, a capacitor is integrated within a vehicle window.

WO 2017/178 146 A1 describes a composite glass pane with a sensor arrangement that has receiving antenna, a transmitting antenna, and an evaluation unit. The sensor arrangement is arranged at least partially between the first and second glass layer.

WO 2013/091 961 A1 presents a composite pane with an antenna structure, wherein a first and second electrically conductive structure are implemented as wires, as printed, conductive structures, or as transparent conductive coatings.

US 2006/0 275 599 A1 describes the insertion of electronic components into a glass pane, preferably a composite glass pane, wherein the electronic components are provided as conductive layers that are virtually invisible.

DE 10 2009 053 465 A1 presents a functional pane with two transparent panes and interpositioned electrical functional elements that are connected to one another via electrical lines.

US 2009/0 039 901 A1 describes a pane with a capacitive rain detector, wherein the rain detector is provided with a material that is substantially transparent at the intended thicknesses. Also described is the use of shielding or sheathing for electrical circuits to reduce interference on the sensor.

DE 10 2004 050 344 A1 presents a rain sensor that is laminated into a motor vehicle window.

US 2005/0 233 125 A1 describes a laminated glass pane, wherein, among other things, light sensors, capacitive sensors, thin-film batteries, or transparent electrical conductors can be provided between the glass panes.

In general, the known solutions for vehicle windows with sensors are perceived as relatively susceptible to interference.

Starting from the prior art, the object of the invention is to propose a vehicle window with relatively low susceptibility to interference. According to another claim, the invention relates to a vehicle.

According to a first aspect of the invention, the vehicle window includes at least one transducer device and transducer electronics associated with the transducer device, with both the transducer device and the transducer electronics arranged at least partially within the vehicle window.

Provision is further made for the transducer device (13) and/or a compensating device (21, 22) associated with the transducer device (13) and arranged at least partially within the vehicle window and/or an electrical shielding device associated with the transducer device (13) for electrically shielding der transducer device relative to a vehicle interior or vehicle exterior to be transparent, at least in sections.

Based on its English origin, the term "transducer" or "transducer device" means a device (for example, an assembly or a component) for converting one form of energy into another form of energy. In this context, "transducer" can also be referred to as "converter" or "energy converter". Preferably, the transducer device is a sensor device, in particular a moisture sensor device. The transducer device, in particular sensor device preferably includes a capacitor, whose capacitance value fluctuates depending on external influences (for example, in the presence of water). Preferably, the transducer device converts a signal from the environment (e.g., moisture or water) into an electrical signal.

The term "an arrangement at least partially within the vehicle window" (this also applies to components mentioned in the following that are to be arranged in this manner) means, in particular, an arrangement in which the respective device or the respective element is embedded at least in the vehicle window, in particular, is completely enclosed by the vehicle window. When a device, such as, possibly, the transducer electronics, comprises multiple individual components, at least one or a plurality or all of these individual components should be arranged, in each case, partially or completely within the vehicle window (i.e., possibly, completely enclosed by the vehicle window).

According to the first aspect of the invention, the transducer electronics, in particular, are thus arranged at least partially within the vehicle window. Until now, in the prior art (even when at least the corresponding sensor is integrated in the vehicle window), the corresponding (signal processing or signal conditioning) electronics have been installed outside on the windshield or in its vicinity. Here, it has been recognized according to the invention that there is, as a result, a relatively long signal path from the transducer device (for example, the sensor) to the electronics; and, thus, (undesirable) interference, parasitic effects, and disruptions can occur. When, however, according to the invention, the electronics are at least partially integrated into the vehicle window (for example, the windshield), they can be arranged closer to the transducer device, thus minimizing the above-mentioned effects. The shorter the distance between the transducer device and the transducer electronics (in particular signal conditioning and/or signal processing electronics), the more robust the transducer system (or the sensor system), since fewer disruptions are coupled into a line path. For this reason, it is advantageous for at least parts of the (possibly, all of the) transducer electronics (evaluation electronics), for example, comprising signal conditioning and/or signal processing electronics, preferably a microcontroller and a driver, to be integrated into the vehicle window (e.g., the windshield), in particular close to the transducer device such that the system as a whole is comparatively robust against electromagnetic interference (e.g., EMP interference, where EMP means "electro magnetic pulse"), parasitic capacitances, parasitic inductances, parasitic resistances, and/or loss of signal energy or signal power.

According to the invention, it has also been taken into account that transducer devices, such as sensor devices in vehicle windows, often carry output signals that have comparatively low power and can therefore be easily disrupted by environmental influences. In the prior art, in the case of a sensor that is laminated into a vehicle window (windshield), electrodes or connecting lines (that are, for example, implemented as flat lines) must be routed the entire path through the vehicle window (windshield) all the way to its edge and farther (via a corresponding connecting line) to a vehicle interface. During such a long route, multiple parasitic effects can occur, in particular, in terms of capacitance, resistance, inductances, and electromagnetic compatibility (EMC). In the case of a capacitive sensor in a windshield, whose capacitance can be in the range of several pF and whose capacitance change caused by the quantity to be measured can be a few fF, a parasitic capacitance of a connecting line of possibly more than 20 pF means a significant disruption.

Preferably, the transducer electronics (evaluation or read out electronics) includes a signal conditioning and/or a signal processing component, preferably an amplifier and/or driver (driver stage) and/or a converter, in particular, an A/D converter, and/or a signal processor and/or a microcontroller. In particular, a driver stage (or parts thereof) can be integrated into the vehicle window (e.g., windshield), for example, within a path of a (flat) connecting line such that, overall, the connecting lines can be kept comparatively short. The driver stage can have a comparatively high input impedance and a comparatively low input capacitance. The driver or the driver stage can then continue a connecting line to the outside (relative to the vehicle window) with comparatively high performance and better driving properties. The driver stage preferably has comparatively good backward isolation such that downstream disruptions cannot propagate backwards to the transducer device and and thus change their output. Furthermore, parts of signal processing electronics, such as, a microcontroller and a vehicle interface can be integrated into the vehicle window (in particular windshield) (or such electronics in their entirety). Overall, a measurement with comparatively high sensitivity and robustness is achieved.

The term "driver" means, in particular, a line amplifier (line driver) or extender that improves a quality of the signal to be transmitted and, possibly, amplifies the signal to be transmitted.

In a specific embodiment, a sensor device (in particular, a capacitive sensor), an amplifier, an A/D converter as well as a microcontroller can be integrated into the vehicle window (for example, between an outer and an inner pane or a first and a second pane, possibly on one plane). Amplifiers, A/D converters, and microcontrollers can be arranged on or at a (flat) electrical connecting line.

According to the present invention, a vehicle window including at least one transducer device that is arranged at least partially within the vehicle window can be provided, with the vehicle window further including an electrical shielding device associated with the transducer device for electrically shielding the transducer device relative to a vehicle interior or a vehicle exterior (or outward, relative to the vehicle window per se).

The term "an electrical shielding device" means, in particular, a device that is electrically conductive (for example, made of metal) and thus blocks an electromagnetic field or electromagnetic field lines.

In principle (as already explained above), transducer devices, in particular capacitive transducer devices or transducer structures can be integrated into a vehicle window (for example, between two individual panes of the vehicle window). Often, such a vehicle window is a windshield. Such transducer devices, in particular sensor devices, can measure external conditions, such as, rain on the vehicle window (windshield). The permittivity of water is significantly higher than that of air such that the capacitance of the sensor changes when the vehicle window (windshield) becomes moist or wet on its outer side, for example. Accordingly, the transducer device (sensor device) can be configured such that a measurement of water is detected due to a capacitance change.

In general, the transducer device can preferably be arranged within a wiping area of the windshield, i.e., an area that is covered by window wipers of the windshield (or, accordingly, a rear window). By this means, even the wiping away of the water can be detected by the transducer device (sensor device).

A main idea of the second aspect consists in increasing the performance of transducer devices in a vehicle window (in particular a capacitive sensor device) by adding the shielding device (which can, in particular, be implemented as a conductive layer). The shielding device (in particular, a conductive layer) can be arranged on an outer surface (for example, a vehicle window inner surface or a vehicle window outer surface). In a specific embodiment, the shielding device is provided on an inner surface of the vehicle window that faces in the direction of vehicle occupants. According to the embodiment, the shielding device (conductive layer) can overlap the transducer device at least partially (possibly, completely).

The term "partial (or complete) overlap" means, in particular, that, in a plan view of the inner or outer side of the vehicle window (windshield), the shielding device (partially or completely) covers the transducer device.

The shielding device can be electrically isolated (in the sense that it is connected to no other components of the vehicle window or of the vehicle). Alternatively, the shielding device can be held at earth potential or at a supply voltage or at some other (possibly earthlike, optionally constant) reference potential.

The shielding device (conductive layer) can be implemented visible or nonvisible or transparent or nontransparent. Furthermore, the conductive layer can be deposited on a surface, in particular an inner surface, of the vehicle window or glued onto this surface.

Overall, it is achieved by the shielding device (in particular, conductive layer) with regard to the transducer device (sensor device) that sensitivity of the transducer device (sensor device) is improved, since field lines that run in the direction of a side of the vehicle window (in particular, the inner side) are shortened by the shielding device (conductive layer). For example, in the case of a moisture measurement, field lines that run outward and are ultimately responsible for the moisture detection, can influence the overall capacitance to a comparatively large extent. Furthermore, influences that are not decisive for the measurement or can distort it, in particular on an inner side, such as, a vehicle window fogged inside (from the inside) or air humidity (in an interior), a vehicle occupant (for example, his hand and), are reduced. Furthermore, the shielding device (conductive layer) can in particular shield the transducer device (sensor structure) from electromagnetic, electrostatic, and permittivity-altering effects (in particular from the inside), making the measurement comparatively robust. Thus, a rain sensor can, for example, effectively control the windshield wiper (outside on the vehicle window).

The transducer device (for example, sensor structure) can be applied by laminating, printing, or depositing onto a surface of an individual pane of the vehicle window.

The shielding device can be laminated, printed, or deposited by laminating, printing, or depositing onto an exposed surface (e.g., inward facing surface) of the vehicle window. In the case of uncoated glass, (silver) printing or (antenna)

film lamination can be carried out. In the case of coated glass, (silver) printing, lasering, or (antenna) film lamination can be used.

The shielding device is, in particular, not implemented as a (an additional) capacitive structure, for example, for a differential measurement (read out), but preferably used as a shielding plate (shielding layer), which is connected, for example, to earth potential or another potential, but is not used for read out.

The electromagnetic shielding device preferably does not extend over relatively large regions of the vehicle window (for example, over the entire vehicle window), but over regions in which the transducer device is arranged. Thus, the shielding device can extend over an area that is at least as large as an area of the transducer device or at least components thereof (such as, a capacitor, in particular a capacitor implemented as an applied or inserted layer) or a maximum of 5 times, or a maximum of 3 times, or a maximum of 1.5 times as large as the transducer device (or an individual element of the transducer device, such as, preferably, a capacitor thereof). Relative to the entire vehicle window, the shielding device preferably extends over less than 10%, preferably less than 5% of the entire area. Optionally, the shielding can extend over the entire pane.

Overall, the robustness of the transducer device is increased. Furthermore, the sensitivity of the transducer device is improved by shielding against undesirable (in particular, internal) effects and because of the fact that the majority of the field lines are routed in the desired direction (for example, an outer surface or a surface of the window directed outward away from the vehicle interior). A measurement of such transducer devices, which are integrated at least partially in a vehicle window (windshield), in particular capacitive sensor devices, are then comparatively little susceptible to unwanted influences (for example, from the vehicle interior) and comparatively sensitive to the desired influences (for example, from outside). This can, in particular, be achieved by applying the shielding device on an outer surface (for example, a surface of the vehicle window, in particular the windshield), preferably as an additional layer, in particular in the form of a conductive film.

The electrical shielding device be arranged on an inner side or an outer side of the vehicle window, preferably at least partially overlapping the transducer device.

According to the present invention, a vehicle window can also be provided including at least one transducer device as well as a compensating device associated with the transducer device, wherein both the transducer device and the compensating device are arranged at least partially within the vehicle window.

The compensating device preferably includes one (or a plurality of) capacitor(s). The capacitor(s) is/are preferably provided by conductive (in particular, metallic) layers that are arranged (applied) in the interior of the vehicle window (in particular between two individual panes).

In one embodiment, the compensating device (in particular its layers) can be arranged on a plane with the transducer device (in particular its layers). In an alternative embodiment, the compensating device can be arranged in a plane, that is at a distance from a plane in which the transducer device (in particular its layers) is arranged.

The compensating device can simultaneously be or include a shielding device (in particular the shielding device described above).

The term "a compensating device" means, in particular, a device that enables a comparative measurement such that undesirable measurement influences can be compensated, in particular by differential evaluation (read out). In principle, (apart from the arrangement according to the invention at least partially within the vehicle window), the compensating device can be implemented and/or operate as described in CN 100 571 035 C.

By means of the compensating device, changes, in particular, in the vehicle window and/or farther from it can be detected and taken into account accordingly (compensated). The compensating device is, in particular, implemented as a capacitor, wherein the capacitor includes two conductive layers. Optionally, the compensating device can even have only one conductive layer, which then enables compensation and cooperation with a conductive layer of the transducer device.

Overall, the robustness and sensitivity of the transducer device (in particular of a capacitive structure) can be improved by a differential measurement structure (or by means of the compensating device). By this means, measurement of conditions at a surface (in particular an outer surface pointing away from the vehicle interior) of the vehicle window can be improved. Possibly, based on the compensating device, sensitivity to temperature and humidity changes farther from the surface can be improved. In particular, the compensating device (reference structure) can be configured such that it feels a sensitivity to moisture at a greater distance from the vehicle window in the same manner as the transducer device; whereas the sensitivity at the surface of the vehicle window (in particular an outer surface pointing away from the vehicle interior) is lower or or even negligible (i.e., is at least virtually equal to zero). Thus, overall, the sensitivity relative to a more distant moisture can be suppressed; whereas sensitivity relative to the outer surface remains unaffected (due to a, in particular, differential evaluation of both structures, i.e., both the transducer device and the compensating device).

Preferably, the transducer device is configured to detect both the condition (e.g., moisture) directly at the vehicle window (windshield) and at a distance therefrom (of, for example, more than 1 cm, in particular more than 10 cm), whereas the compensating device is configured to measure at least substantially only the conditions at the farther distance. Then, by differential comparison, the conditions farther away from the transducer device can be calculated.

According to a fourth aspect of the invention (which can, in particular, be combined with one or more of the above aspects), a vehicle window including at least one transducer device (which is preferably arranged at least partially in the vehicle window) is proposed as well as electrical connection lines (electrodes) associated with the transducer device, wherein the electrical connection lines have, at least in sections, an increased distance from one another.

The increased distance can preferably be obtained by moving the connection lines away from each other in sections over their course (possibly subsequently moving them back nearer each other). Alternatively, or additionally, the increased distance can be obtained in that at least one connection line spaced at a distance from the end of the conducting section of the transducer device is contacted by the conducting section. In this alternative, contacting is thus not arranged at an end of the conductive section (actually reasonably used for this, without taking the invention into account), but instead, at a distance from it. The distance can, for example, be at least 20%, more preferably at least 50% of a maximum possible distance on the corresponding conductive section (conductor) of the transducer device, such as a corresponding conductive layer. If there are several ends, for example, at least two or at least three or at least five ends of the conductive section (of the conductive layer), the above distancing rule preferably applies to all of these ends.

The increased distance can be at least 2 mm, more preferably at least 10 mm, even more preferably at least 20 mm.

A main idea of the fourth aspect consists in that, in sections, an increased distance (not actually necessary for the signal or power line) is set between the connection lines. It has been recognized that not only sensitivity (in particular capacitance) of the actual transducer device can change with changing external conditions, but also corresponding connection lines (electrodes), which connect the transducer device, for example, with transducer electronics, inside or outside the vehicle window. These can form a parasitic (capacitive) structure, with electrical field lines outside the vehicle window. Thus, for example, water near the connection lines (electrodes) can change the total capacitance of the entire structure. In particular, the region of the vehicle window (windshield), in which the connection lines (electrodes) are placed need not (necessarily) be placed in the region (for example, a region of windshield wipers) whose change is to be detected (for example, the extent to which the water has been wiped away by the windshield wipers). Thus, the connection lines (electrodes) per se are possibly not (necessarily) considered to be part of a functional transducer device (sensor device). Instead, the connection lines (in general) have to be considered as an undesirable parasitic influence (capacitance) that can cause a corresponding error in the measurement.

According to the fourth aspect of the invention, the performance of the transducer device (in particular of the capacitive sensor device) is now improved by reducing a parasitic influence (capacitance) of the connection lines (electrodes structures) by setting their distance relatively large (at least until they reach another component, in particular transducer electronics, preferably evaluation electronics).

In the case of a transducer device that includes two parallel (flat) conductive layers, the connection lines preferably do not run aligned with the electrical layers and/or (in the geometric sense) parallel to one another, but rather move away from each other in sections (for example, in a region in which they are contacted), in particular in a direction perpendicular to a course of the electrical layers.

In the case of a transducer device that has an inner (e.g., circular) structure and an outer (e.g., annular) structure (conductive layer) having an interruption, the electrical connection line for the outer structure (layer) can be arranged at a distance from an end of the outer layer (which is adjacent the interruption) (for example, by at least 10%, preferably at least 20% of the maximum possible separating distance; relative to both ends, each of which is adjacent the interruption). Alternatively, or additionally, in such an embodiment, the connection lines can move away from each other (possibly until they reach another electrical component, such as in particular transducer electronics).

In an embodiment that has two conductive layer that mesh with one another in a rake-like manner (without touching one another conductively), a contact for a connection line of one of the conductive layers can be spaced away from one (of the multiple ends in a rake-like embodiment) at a distance or, correspondingly, away from all ends (by at least 10%, preferably at least 20% of a maximum possible distance, in particular with respect to all ends).

The increased distance according to the fourth aspect is, in particular, a distance that is greater than a potential minimum distance between electrical connection lines at the location of their contact with the conductive structures (conductive layers) predefined by the distance between two structures (layers), preferably at least 1.2 times, more preferably at least 2 times, even more preferably at least 5 times as large as such a minimum separating distance. Preferably, a distance between the two contacting points (involved) (i.e., a contacting point on a first conductor or a first conductive layer and a second contacting point on a second conductor or a second conductive layer) is at least 20%, preferably at least 50% of a maximum possible separating distance.

The transducer device can be arranged between two layers, in particular two individual panes of the vehicle window arranged one above the other.

The transducer electronics (or at least elements thereof) can be arranged between two layers, in particular two individual panes of the vehicle window arranged one above the other.

The compensating device can be arranged between two layers, preferably two individual panes of the vehicle arranged one above the other.

The shielding device can be arranged between two layers, in particular two individual panes of the vehicle window arranged one above the other.

The transducer device preferably includes a sensor device (or a sensor), in particular a moisture sensor.

The sensor of the transducer device can be transparent and can be configured at any position and/or with any size. In particular, the sensor can even be arranged over the entire transparent extension of the vehicle window, with no significant qualitative impairment of a field of vision of the vehicle window.

In this context, the size or area or extension of the sensor can be configured arbitrarily. Thus, a sensitivity or the active surface can be increased expediently or the sensitivity of the sensor can be optimized expediently. When the sensor is designed, for example, as a rain sensor, an optimized reaction to changing surrounding conditions can occur due to the enlarged or enlargeable sensor area.

The transducer device can have one, exactly two, or more electrically conductive layers. The two or more electrically conductive layers can be isolated from one another. The two or more electrically conductive layers can be arranged in one plane or in different planes. According to the embodiment, the transducer device can include a capacitor, wherein the capacitor preferably includes two electrically conductive layers (that are isolated from one another).

The compensating device can include one, two, or more conductive layers. The two or more electrically conductive layers can be isolated from one another. The two or more electrically conductive layers can be arranged in one plane or in different planes. The compensating device can include a capacitor, wherein the capacitor preferably includes two electrically conductive layers (that are isolated from one another).

The shielding device can include at least one or two or more electrically conductive layers. The two or more electrically conductive layers can be isolated from one another. The two or more electrically conductive layers can be arranged in one plane or in different planes.

The respective electrically conductive layer can be implemented as a metal layer (for example, printed, deposited, or laminated). Provision is made according to the present invention for the transducer device and/or the compensating device and/or the electrical shielding device, in particular at least their conductive layers, to be transparent (at least, in sections; optionally, completely).

The transducer device and/or the transducer electronics and/or the compensating device and/or the electrical shielding device and/or (the) electrical connection line(s), in particular at least their conductive layers, can be produced at least partially by coating and/or printing and/or depositing and/or patterning, e.g., by laser and/or masking, and/or by inserting a previously coated and/or patterned insert, e.g., a PET film, which is preferably coated, optionally, the corresponding layer patterned thereon, e.g., by laser, and then preferably laminated into the pane as a finished insert.

The vehicle window is preferably a vehicle window pane, in particular a windshield or, alternatively, a rear window.

The aforementioned object is further accomplished by a vehicle, in particular a motor vehicle, preferably a passenger car or a truck or a bus, or a train or a watercraft, including a vehicle window of the type above.

The term "an electrically insulating material" means, in particular, a material that has, at room temperature (25° C.), electrical conductivity of less than $10^{-1}$ S·m$^{-1}$ (optionally less than $10^{-8}$ S·m$^{-1}$). Accordingly, "an electrical conductor" or "a material (or coating) with electrical conductivity" means a material that has electrical conductivity of, preferably, at least 10 S·m$^{-1}$, more preferably at least $10^3$ S·m$^{-1}$ (at room temperature of, in particular, 25° C.).

The vehicle window (in particular, the windshield) can include a first pane (outer pane) and a second pane (inner pane), which are, optionally, joined to one another via a preferably thermoplastic intermediate layer, preferably based on polyvinyl acetal, in particular polyvinyl butyral. The vehicle window (windshield) is preferably provided, in a window opening of a vehicle, to separate the interior from the external surroundings. "Inner pane" refers to the pane of the composite pane facing the interior (vehicle interior). "Outer pane" refers to the pane facing the external surroundings.

The vehicle window (outer pane and/or inner pane) preferably contains glass, optionally, soda lime glass. The vehicle window (outer pane and/or inner pane) can, in principle, also contain other types of glass, such as quartz glass or borosilicate glass. Or even rigid plastics, in particular, polycarbonate or polymethyl methacrylate.

The (thermoplastic) intermediate layer preferably contains at least one thermoplastic polymer, preferably ethylene vinyl acetate (EVA), polyvinyl butyral (PVB), or polyurethane (PU) or mixtures or copolymers or derivatives thereof, particularly preferably PVB. A minimum thickness of the (thermoplastic) bond (laminating film) is preferably 0.2 mm to 2 mm, more preferably 0.3 mm to 1 mm. "Minimum thickness" refers to the thickness at the thinnest point of the intermediate layer.

The (thermoplastic) intermediate layer can be formed by a thermoplastic laminating film (optionally, of variable thickness).

In all, multiple intermediate layers (between the outer pane and the inner pane), for example, at least two or more intermediate layers (or such films) can be formed.

The intermediate layer can also be implemented as or contain an acoustic film that has a noise-damping effect. Such films can consist of at least three plies, wherein the middle ply can have higher plasticity or elasticity than the surrounding outer plies, for example, as a result of a higher plasticizer content.

According to another aspect of the invention, a method is provided for producing a vehicle window, comprising the following steps:

Providing the two individual panes to be arranged one atop the other and an intermediate layer to be arranged therebetween;

Printing a transparent, conductive ink layer for forming the sensor, in particular, a capacitive sensor arrangement, on at least one side of the intermediate layer;

Contacting the transparent, conductive ink layer with an electrical conductor, in particular connecting a flat conductor by means of an electrically conductive adhesive element; and Superimposing and laminating the individual panes and the interpositioned intermediate layer for forming the vehicle window.

Provision is made to implement the sensor as a transparent sensor. Preferably, the sensor is implemented as a capacitive sensor, in particular as a rain sensor. In this context, the formation of a complete, preferably capacitive sensor arrangement in transparent form can be provided, which can also include the transducer device or other structures. Any position of the sensor or the sensor arrangement is available in any size along the vehicle window without substantial qualitative impairment of the vehicle window, in particular, of the field of vision of the vehicle window.

In addition, the transparent, conductive ink layer or paint layer is connected to an electrical conductor, preferably an electrically conductive flat connector. The connection of the flat connector can be done by means of an electrically conductive adhesive or adhesive element.

In this context, "an ink layer" means that the layer can be applied in an ink jet printing method or a screen printing method. Thus, "an ink layer" preferably means any processable substance for forming an electrically conductive structure in the course of, for example, an ink jet printing process, for example.

Moreover, provision is made for the transparent, conductive ink layer to be arranged on the intermediate layer and thus arranged between the individual panes. The printing or applying of the ink layer or the paint layer is provided on at least one side of the intermediate layer that is directed toward the individual panes in the assembled vehicle window, i.e., the first pane or the second pane.

As an optional step, provision can also be made for the intermediate layer to be preheated prior to printing to a temperature that is above room temperature but below 60° C.

Furthermore, provision can be made to dry the electrically conductive paint layer or ink layer after printing or application on the intermediate layer in air, i.e., under atmospheric conditions, or in a furnace with a temperature above room temperature, but preferably below 60° C.

The printing of the transparent, conductive ink layer or paint layer can be done by means of an ink jet printing method or a screen printing method.

Figure 2:
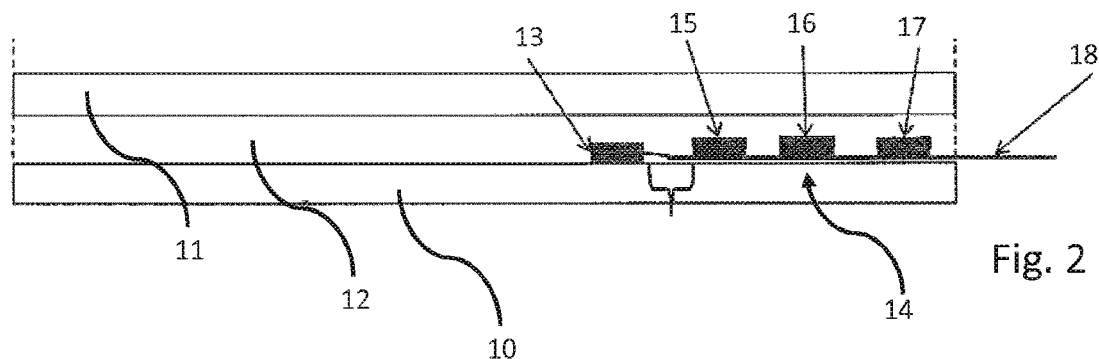
Figure 3:
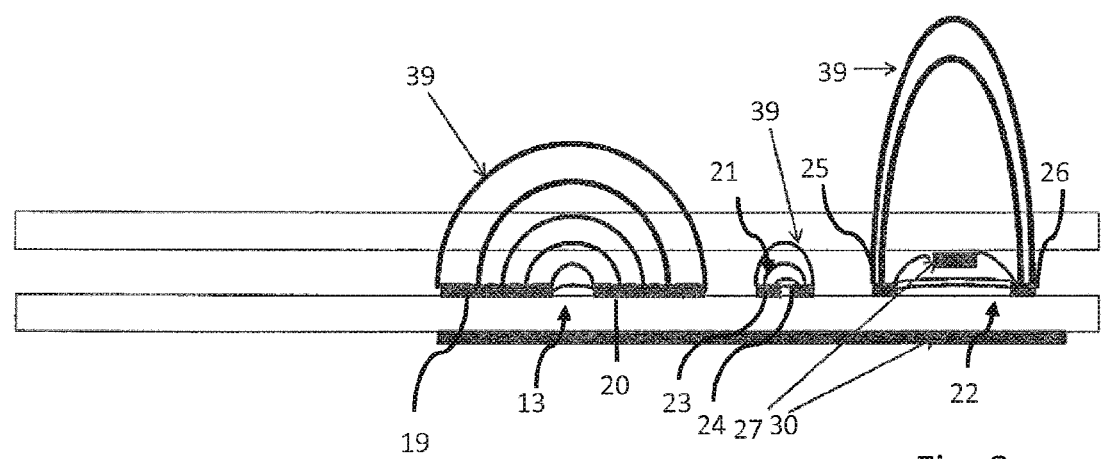
Figure 4:
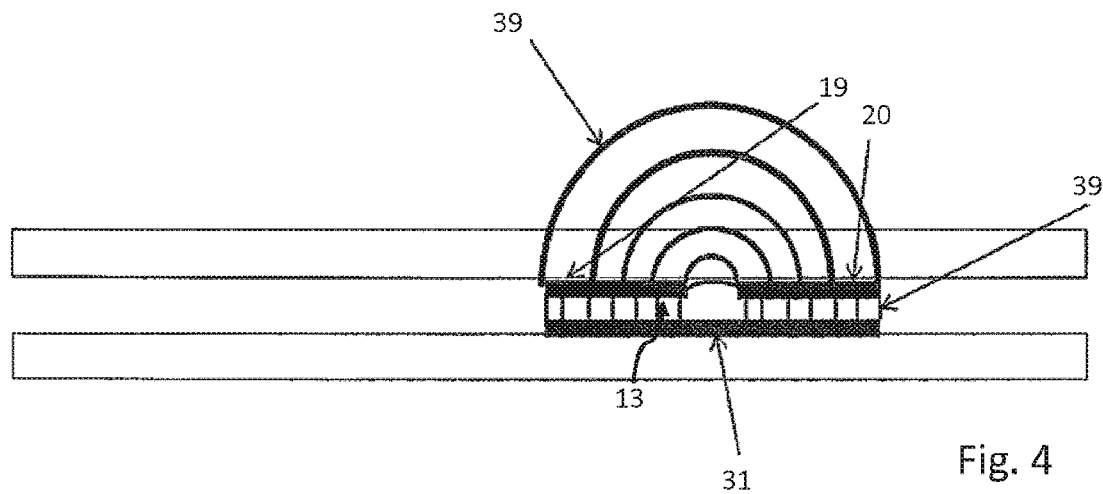
Figure 5:
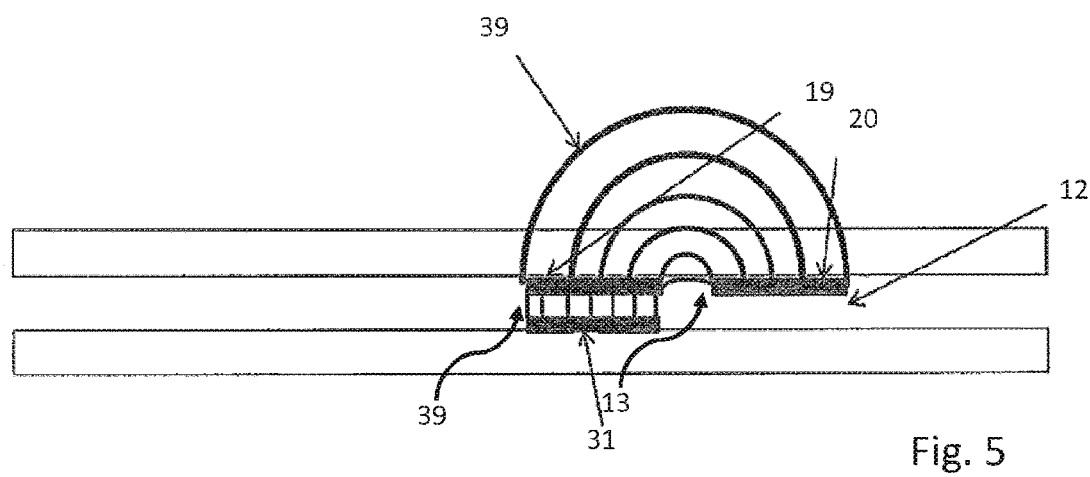
Figure 6:
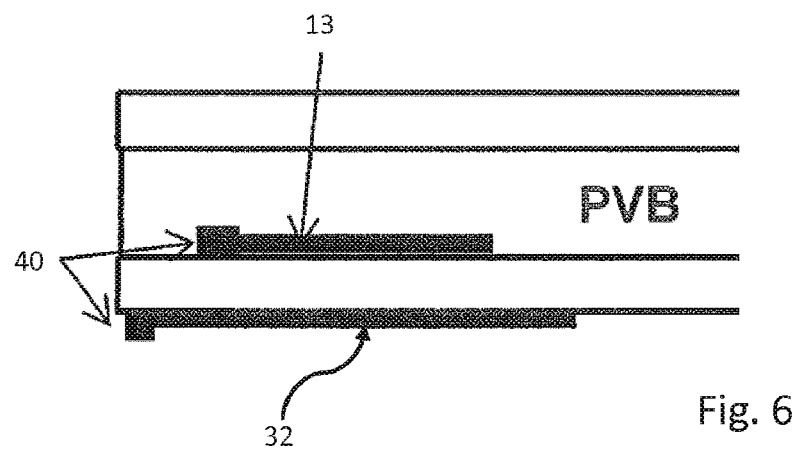
Figures 7, 8, 9:
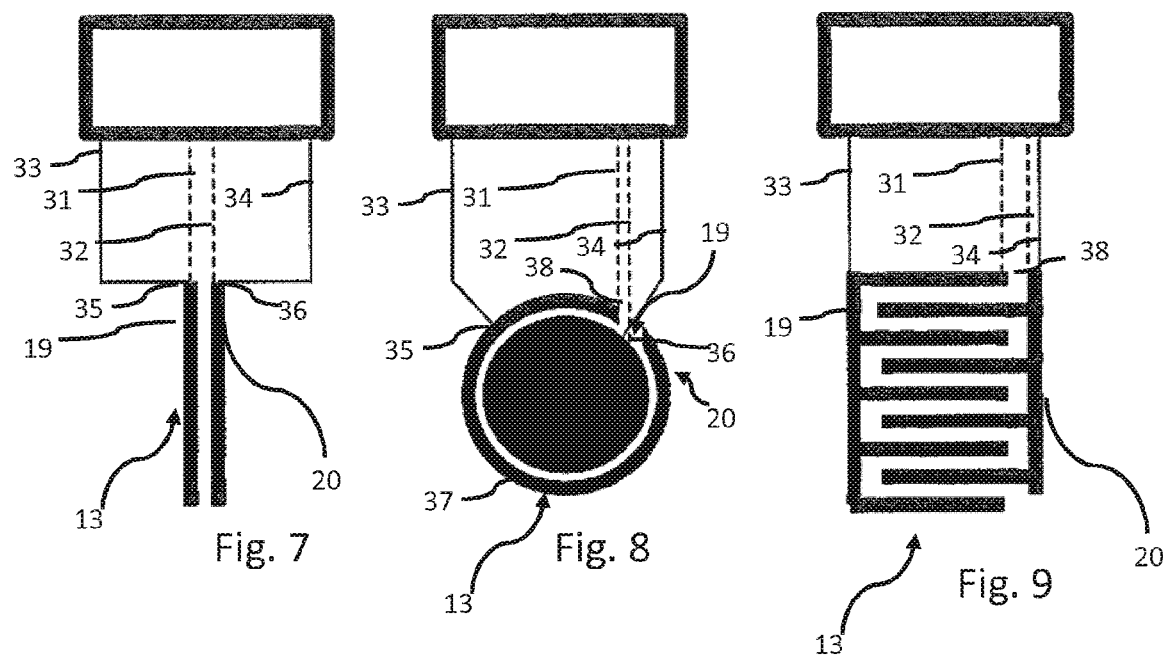

The invention is explained in the following with reference to the accompanying figures. They depict:

FIG. 1 a schematic view of a first embodiment of the invention from above;

FIG. 2 a schematic sectional view of the embodiment of FIG. 1;

FIG. 3 a schematic sectional view of another embodiment of the invention;

FIG. 4 a schematic sectional view of another embodiment of the invention;

FIG. 5 a schematic sectional view of another embodiment of the invention;

FIG. 6 a schematic sectional view of another embodiment of the invention;

FIG. 7 a schematic view of another embodiment of the invention in a view from above;

FIG. 8 a schematic view of another embodiment of the invention from above; and FIG. 9 a schematic view of another embodiment of the invention from above.

The FIGS. 1 and 2 depict an embodiment of the vehicle window according to the invention in a view from above and a schematic sectional view, respectively. The vehicle window of FIGS. 1 and 2 comprises a first (inner) pane 10, a second (outer) pane 11, and an intermediate layer 12 between the first and second pane 10, 11. A transducer device 13 in the form of a sensor is arranged in the intermediate layer 12. Furthermore, transducer electronics 14, comprising an amplifier 15, an A/D converter 16, and a microcontroller 17 are arranged in the intermediate layer 12. The amplifier 15, A/D converter 16, and microcontroller 17 are arranged at or on a signal line 18 (electrical line). A distance between the transducer device 13 and the transducer electronics 14 is comparatively small.

FIG. 3 depicts another embodiment of the invention in a schematic section with schematic field lines 39. Here, a transducer device 13 is presented in the form of a sensor (a moisture sensor) in the intermediate layer 12. The transducer device comprises two electrically conductive layers 19, 20. Also provided in the intermediate layer 12 are compensating devices 21, 22, which also comprise capacitors that are specifically formed by conductive layers 23/24 or 25/26. Further provided in the intermediate layer 12, above the conductive layers 25, 26 is a shielding device 27. This blocks, in particular, field lines 39 between the conductive layers 25, 26 that run relatively close to an outer surface 28 of the second pane 11, but does not block field lines penetrating farther out (or only blocks them to a lesser extent).

Another shielding device 30, which shields both the transducer device 13 and the compensating devices 21, 22 (inwardly, i.e., relative to a vehicle interior), is provided on an inner surface 29. For this purpose, the shielding device 30 overlaps the transducer device 13 and the compensating devices 21, 22 (without touching them).

FIG. 4 depicts another embodiment of the invention in a schematic section. There, a transducer device 13 comprising conductive layers 19, 20 is arranged in the intermediate layer 12. In the same intermediate layer 12 (but in a plane spaced apart), a conductive layer 31 is arranged. The conductive layer 31 forms, first, a compensating device (together with the conductive layers 19, 20) and, on the other hand, also a shield (with respect to an interior relative to the vehicle window). According to FIG. 4, the conductive layer 31 overlaps both conductive layers 19, 20.

FIG. 5 depicts another embodiment in a schematic section. This corresponds substantially to the embodiment of FIG. 4, wherein, however, the conductive layer 31 only extends over the conductive layer 19 (and not over the conductive layer 20).

FIG. 6 depicts another embodiment of the invention. Here, a transducer device 13 is provided in the intermediate layer 12. A shielding device 32, similar to the shielding device 32 of FIG. 3 (but without the compensating devices 21, 22 there, which can, however, also be provided in the embodiment of FIG. 6) is depicted on a surface of the first pane 10 (toward a vehicle interior). The transducer device 13 and the shielding device 32 are preferably electrically connected via contacts 40.

In all embodiments, the intermediate layer 12 can be formed by an (electrically insulating), in particular (melt) adhesive and/or a plastic based on polyvinyl acetyl, preferably polyvinyl butyral (PVB).

FIG. 7 depicts another embodiment of the invention. There, a transducer device 13 with two (strip-shaped) conductive layers 19, 20 is depicted (which, together, form a capacitor). The conductive layers 19, 20 run parallel to each other. The dashed lines represent connection lines 31, 32 (not according to the invention), which lead to transducer electronics 14, as could be provided in the prior art. In contrast, connection lines 33, 34 according to the invention are depicted. Starting from the contact points 35, 36, these move away from each other (in sections), such that a distance between the connection lines 33, 34 is (significantly) increased compared to the conventional connection lines 31, 32.

FIG. 8 depicts another embodiment of the invention. Here, conductive layers 19, 20 are provided (which, together, form a capacitor). The conductive (inner) layer 19 is circular. The conductive (outer) layer 20 is annular, with the ring interrupted such that the inner conductive layer 19 can be contacted (in the same plane). Here again, dashed lines depict connection lines 31, 32, as could be provided in the prior art. The connection lines 33, 34 according to the invention are drawn as solid lines. As is discernible in FIG. 8, these connection lines 33, 34 also move apart from each other (in sections). Furthermore, the contact points 35, 36 are located at a comparatively large distance from one another (compared to corresponding contact points that can be derived from the dashed lines 31, 32). The contact point 36 is, here, (at least substantially) defined by the structure of the conductive layers. The contact point 35 is deliberately realized far from it, preferably at a distance, corresponding to more than 20% of a maximum possible distance that would result, for example, if a contact point were provided at the position 37. This enables, in a simple manner, positioning the connection lines 33, 34 comparatively far apart.

FIG. 9 depicts another embodiment of the invention. Here again, connection lines 31, 32, as they could be provided in the prior art, are drawn as dashed lines. In contrast, the connection lines 33, 34 according to the invention are spaced farther apart. Here, this is, in particular, achieved by selecting contact points 35, 36 (similar to the embodiment of FIG. 8) such that they are comparatively far apart. In particular, the contact point 35 is arranged at a distance from one end 38 of the conductive layer 19. Here as well, the distance between contact points 35, 36 is again greater than actually necessary for making contact, in particular at least 20% of a maximum possible distance.

LIST OF REFERENCE CHARACTERS

10 first (inner) pane
11 second (outer) pane
12 intermediate layer
13 transducer device
14 transducer electronics
15 amplifier
16 A/D converter
17 microcontroller
18 signal line
19 conductive layer
20 conductive layer
21 compensating device
22 compensating device
23 conductive layer 24 conductive layer
25 conductive layer
26 conductive layer
27 shielding device
28 outer Oberfläche
29 inner Oberfläche
30 shielding device
31 conductive layer
32 shielding device
33 connection line
34 connection line
35 contact point
36 contact point
37 position
38 end
39 field line
40 contact

The invention claimed is:

1. A vehicle window, comprising at least one transducer device, transducer electronics associated with the transducer device, and a compensating device associated with the transducer device, wherein all of the transducer device, the transducer electronics, and the compensating device are arranged at least partially within the vehicle window,
wherein
the transducer device and/or
the compensating device and/or
an electrical shielding device associated with the transducer device for electrically shielding the transducer device relative to a vehicle interior or a vehicle exterior
are transparent, at least in sections, and
wherein
the compensating device includes at least one capacitor,
the compensating device is arranged in a plane that is different from a plane in which the transducer device is arranged, and
the compensating device is simultaneously the electrical shielding device, or includes the electrical shielding device, the compensating device being arranged to at least partially overlap the transducer device in a plane of the vehicle window.

2. The vehicle window according to claim 1, wherein the transducer electronics include a signal conditioning and/or signal processing component.

3. The vehicle window according to claim 1, wherein the transducer device and the transducer electronics have a distance of less than 5 cm from one another.

4. The vehicle window according to claim 1, wherein the electrical shielding device is electrically isolated or is held at earth potential or at a supply voltage or at some other reference potential.

5. The vehicle window according to claim 1, wherein the electrical shielding device is arranged on an inner side or an outer side of the vehicle window.

6. The vehicle window according to claim 1, further comprising electrical connection lines associated with the transducer device, wherein the electrical connection lines have, at least in sections, an increased distance from one another,
wherein the increased distance is achieved in that the connection lines are moved away from one another, in sections, over their course and/or in that at least one connection line is in contact with a conductive section of the transducer device at a distance from one end of the respective section, and/or
wherein the increased distance is at least 2 mm.

7. The vehicle window according to claim 1, wherein the transducer device and/or the transducer electronics and/or the compensating device and/or the shielding device is/are arranged, at least partially, between two layers of the vehicle window arranged one above the other.

8. The vehicle window according to claim 1, wherein the transducer device comprises a sensor.

9. The vehicle window according to claim 8, wherein the sensor is transparent.

10. The vehicle window according to claim 1, wherein the transducer device and/or the compensating device and/or the shielding device comprises/comprise at least one electrically conductive layer and/or the transducer device and/or the compensating device comprises/comprise at least two electrically conductive layers, wherein the two electrically conductive layers are isolated from one another and are arranged in one plane or in different planes and/or
wherein the transducer device comprises a capacitor.

11. The vehicle window according to claim 1, wherein the transducer device and/or the transducer electronics and/or the compensating device and/or the electrical shielding device and/or electrical connection line(s) associated with the transducer device are produced at least partially by coating and/or printing and/or depositing and/or patterning and/or by inserting a previously coated and/or patterned insert.

12. The vehicle window according to claim 1, wherein the vehicle window is a vehicle window pane.

13. A vehicle including a vehicle window according to claim 1.

14. A method for producing a vehicle window according to claim 1, comprising:
providing the two individual panes to be arranged one above the other and an intermediate layer to be arranged therebetween;
printing a transparent, conductive ink layer for forming the sensor on at least one side of the intermediate layer;
contacting the transparent, conductive ink layer with an electrical conductor; and
superimposing and laminating the individual panes and the interpositioned intermediate layer for forming the vehicle window.

15. The method according to claim 14, wherein the printing of the transparent, conductive ink layer is done by an ink jet printing method or a screen printing method.

16. The vehicle window according to claim 2, wherein the signal conditioning and/or processing component is an amplifier and/or a driver and/or a converter, and/or a signal processor and/or a microcontroller.

17. The vehicle window according to claim 5, wherein the electrical shielding device is arranged at least partially overlapping the transducer device.

18. The vehicle window according to claim 6, wherein the increased distance is at least 10 mm.

19. The vehicle window according to claim 7, wherein the transducer device and/or the transducer electronics and/or the compensating device and/or the shielding device is/are arranged, at least partially, between two individual panes of the vehicle window arranged one above the other.

20. The vehicle window according to claim 12, wherein the vehicle window is a windshield.

* * * * *